United States Patent
Ford et al.

(10) Patent No.: US 11,025,638 B2
(45) Date of Patent: Jun. 1, 2021

(54) SYSTEM AND METHOD PROVIDING SECURITY FRICTION FOR ATYPICAL RESOURCE ACCESS REQUESTS

(71) Applicant: Forcepoint, LLC, Austin, TX (US)

(72) Inventors: Richard A. Ford, Austin, TX (US); Jeff Timbs, Austin, TX (US); Kurt Natvig, Thatcham (GB)

(73) Assignee: Forcepoint, LLC, Austin, TX (US)

( * ) Notice: Subject to any disclaimer, the term of this patent is extended or adjusted under 35 U.S.C. 154(b) by 231 days.

(21) Appl. No.: 16/040,128

(22) Filed: Jul. 19, 2018

(65) Prior Publication Data
US 2020/0028853 A1 Jan. 23, 2020

(51) Int. Cl.
*G06F 21/00* (2013.01)
*H04L 29/06* (2006.01)

(52) U.S. Cl.
CPC .......... *H04L 63/105* (2013.01); *H04L 63/107* (2013.01); *H04L 63/108* (2013.01); *H04L 63/1416* (2013.01); *H04L 63/1425* (2013.01)

(58) Field of Classification Search
CPC .... G06F 21/565; G06F 21/554; G06F 21/568; G06F 21/602; G06F 7/582; H04L 9/002; H04L 9/0861; H04L 63/0428; H04L 63/145
See application file for complete search history.

(56) References Cited

U.S. PATENT DOCUMENTS

| | | |
|---|---|---|
| 6,072,875 A | 6/2000 | Tsudik |
| 7,107,447 B2 | 9/2006 | Sanin et al. |
| 7,574,740 B1 | 8/2009 | Kennis |
| 7,694,150 B1 | 4/2010 | Kirby |
| 7,882,538 B1 | 2/2011 | Palmer |

(Continued)

FOREIGN PATENT DOCUMENTS

| | | | | |
|---|---|---|---|---|
| WO | WO-2019153581 A1 * | 8/2019 | ......... | H04L 63/1408 |
| WO | WO-2019153581 A1 | 8/2019 | | |

OTHER PUBLICATIONS (Matt Klein, How to Erase Your iOS Device After Too Many Failed Passcode Attempts, https://www.howtogeek.com/264369/how-to-erase-your-ios-device-after-too-many-failed-passcode-attempts/, Jul. 28, 2016, hereinafter KLEIN).*

(Continued)

*Primary Examiner* — Maung T Lwin
(74) *Attorney, Agent, or Firm* — Terrile, Cannatti & Chambers; Stephen A. Terrile

(57) ABSTRACT

A method, system and computer-usable medium for providing security friction to a request for access to a resource based on whether the access request is atypical. In certain embodiments, a request to access the resource based on a user identity is received electronically. The system determines whether the request is typical or atypical. If the request is typical, access to the requested resource is granted. However, if the request is atypical, access to the requested resource is only allowed if the correct information is provided in response to one or more access control methods that provide an amount of security friction that would otherwise not have been asserted if the resource request was typical. In certain embodiments, an elapsed time between access requests based on the user identity is used to determine whether the access request is atypical.

22 Claims, 9 Drawing Sheets

(56) References Cited

U.S. PATENT DOCUMENTS

| | | |
|---|---|---|
| 8,181,253 B1 | 5/2012 | Zaitsev et al. |
| 8,230,505 B1 | 7/2012 | Ahrens et al. |
| 8,312,064 B1 | 11/2012 | Gauvin |
| 8,424,061 B2* | 4/2013 | Rosenoer ............ G06F 16/258 726/4 |
| 8,484,066 B2 | 7/2013 | Miller et al. |
| 8,490,163 B1 | 7/2013 | Harsell et al. |
| 8,713,633 B2 | 4/2014 | Thomas |
| 8,826,443 B1 | 9/2014 | Raman et al. |
| 8,892,690 B2* | 11/2014 | Liu ..................... H04L 51/04 709/219 |
| 8,990,930 B2 | 3/2015 | Burrell et al. |
| 9,015,812 B2 | 4/2015 | Plattner et al. |
| 9,015,847 B2 | 4/2015 | Kaplan et al. |
| 9,166,999 B1 | 10/2015 | Kulkarni et al. |
| 9,246,941 B1 | 1/2016 | Gibson et al. |
| 9,342,553 B1 | 5/2016 | Fuller |
| 9,485,266 B2 | 11/2016 | Baxley et al. |
| 9,596,146 B2 | 3/2017 | Coates et al. |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2* | 10/2018 | Little ................... G06Q 40/02 |
| 10,187,369 B2 | 1/2019 | Caldera et al. |
| 10,237,298 B1* | 3/2019 | Nguyen ............... H04L 63/10 |
| 10,270,794 B1* | 4/2019 | Mukerji ............ H04L 63/1458 |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,579,281 B2 | 3/2020 | Cherubini et al. |
| 2002/0078382 A1 | 6/2002 | Sheikh et al. |
| 2002/0123865 A1 | 9/2002 | Whitney et al. |
| 2003/0145225 A1 | 7/2003 | Bruton et al. |
| 2003/0145226 A1 | 7/2003 | Bruton et al. |
| 2003/0188189 A1 | 10/2003 | Desai et al. |
| 2004/0034582 A1 | 2/2004 | Gilliam et al. |
| 2004/0044613 A1 | 3/2004 | Murakami et al. |
| 2005/0138402 A1 | 6/2005 | Yoon et al. |
| 2005/0198099 A1* | 9/2005 | Motsinger ............ G06F 21/55 709/200 |
| 2005/0257258 A1* | 11/2005 | Kinoshita ........... H04L 67/2852 726/12 |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0085543 A1 | 4/2006 | Hrastar et al. |
| 2006/0129382 A1 | 6/2006 | Anand et al. |
| 2006/0195905 A1 | 8/2006 | Fudge |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0082722 A1 | 4/2008 | Savagaonkar et al. |
| 2008/0168002 A1 | 7/2008 | Kagarlis et al. |
| 2008/0168135 A1 | 7/2008 | Redlich et al. |
| 2009/0006888 A1 | 1/2009 | Bernhard et al. |
| 2009/0228474 A1 | 9/2009 | Chiu et al. |
| 2009/0249466 A1 | 10/2009 | Motil et al. |
| 2009/0254572 A1 | 10/2009 | Redlich et al. |
| 2010/0010968 A1 | 1/2010 | Redlich et al. |
| 2010/0058016 A1* | 3/2010 | Nikara ............... G06F 12/1027 711/163 |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0275263 A1 | 10/2010 | Bennett et al. |
| 2011/0061093 A1* | 3/2011 | Korkus ................ G06F 21/604 726/4 |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0137367 A1 | 5/2012 | Dupont et al. |
| 2012/0210158 A1 | 8/2012 | Akiyama et al. |
| 2013/0054433 A1 | 2/2013 | Giard et al. |
| 2013/0080641 A1 | 3/2013 | Lui et al. |
| 2013/0097662 A1 | 4/2013 | Pearcy et al. |
| 2013/0102283 A1 | 4/2013 | Lau et al. |
| 2013/0231084 A1 | 9/2013 | Raleigh |
| 2013/0238422 A1 | 9/2013 | Saldanha |
| 2013/0275574 A1 | 10/2013 | Hugard, IV et al. |
| 2013/0298192 A1 | 11/2013 | Kumar et al. |
| 2013/0305358 A1 | 11/2013 | Gathala et al. |
| 2013/0320212 A1 | 12/2013 | Valentino et al. |
| 2014/0075004 A1 | 3/2014 | Van Dusen et al. |
| 2014/0096215 A1* | 4/2014 | Hessler ................ H04W 12/06 726/7 |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2015/0066896 A1 | 3/2015 | Davis et al. |
| 2015/0082430 A1 | 3/2015 | Sridhara et al. |
| 2015/0096020 A1* | 4/2015 | Adams .................. H04L 63/10 726/23 |
| 2015/0121496 A1* | 4/2015 | Caldeira De Andrada ........... H04L 63/0861 726/7 |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1* | 7/2015 | Ogawa ................ H04L 63/1416 726/23 |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0350902 A1 | 12/2015 | Baxley et al. |
| 2016/0021117 A1 | 1/2016 | Harmon et al. |
| 2016/0042179 A1 | 2/2016 | Weingarten et al. |
| 2016/0055334 A1 | 2/2016 | Herwono et al. |
| 2016/0078362 A1 | 3/2016 | Christodorescu et al. |
| 2016/0092774 A1 | 3/2016 | Wang et al. |
| 2016/0164922 A1 | 6/2016 | Boss et al. |
| 2016/0226914 A1 | 8/2016 | Doddy et al. |
| 2016/0232353 A1 | 8/2016 | Gupta et al. |
| 2016/0261621 A1* | 9/2016 | Srivastava .......... H04L 63/1466 |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1* | 2/2017 | Lishok ................ G06Q 20/3224 |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0126718 A1 | 5/2017 | Baradaran et al. |
| 2017/0149795 A1 | 5/2017 | Day, II |
| 2017/0155669 A1* | 6/2017 | Sudo ..................... G06F 21/55 |
| 2017/0214705 A1 | 7/2017 | Gupta |
| 2017/0230418 A1 | 8/2017 | Amar et al. |
| 2017/0244729 A1 | 8/2017 | Fahrny et al. |
| 2017/0255938 A1* | 9/2017 | Biegun ............... G06Q 20/4016 |
| 2017/0279616 A1 | 9/2017 | Loeb et al. |

(56) References Cited

U.S. PATENT DOCUMENTS

| | | |
|---|---|---|
| 2017/0286671 A1 | 10/2017 | Chari et al. |
| 2017/0331828 A1 | 11/2017 | Caldera et al. |
| 2018/0004948 A1 | 1/2018 | Martin et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0082307 A1 | 3/2018 | Ochs et al. |
| 2018/0091520 A1* | 3/2018 | Camenisch ........... H04L 63/102 |
| 2018/0121514 A1 | 5/2018 | Reisz et al. |
| 2018/0150570 A1 | 5/2018 | Broyd et al. |
| 2018/0191857 A1 | 7/2018 | Schooler et al. |
| 2018/0248863 A1 | 8/2018 | Kao et al. |
| 2018/0285363 A1 | 10/2018 | Dennis et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0052660 A1 | 2/2019 | Cassidy et al. |
| 2019/0289021 A1 | 9/2019 | Ford |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1* | 12/2019 | DeLuca ............. G06Q 20/4016 |
| 2020/0034462 A1 | 1/2020 | Narayanaswamy et al. |
| 2020/0036740 A1 | 1/2020 | Ford |
| 2020/0089692 A1 | 3/2020 | Tripathi et al. |

OTHER PUBLICATIONS symantec.com, Which tuning is available for improving the performance of Symantec Endpoint Protection clients during scan, https://support.symantec.com/en_US/article.TECH143941.html, Jan. 6, 2011.

microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS One 12(2): e0170579, 2017.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

* cited by examiner

SYSTEM AND METHOD PROVIDING SECURITY FRICTION FOR ATYPICAL RESOURCE ACCESS REQUESTS

BACKGROUND OF THE INVENTION

Field of the Invention

The present invention relates in general to the field of computers and similar technologies, and in particular to software utilized in this field. Still more particularly, it relates to a method, system and computer-usable medium providing security friction for atypical resource access requests.

Description of the Related Art

Users interact with resources of all kinds daily. Each interaction, whether accidental or intended, poses some degree of security risk. Security risks are often reduced by granting access rights to a resource to only those individuals who need to access the resource in performing the individual's job functions. As the individual moves within the organization between projects, departments, job responsibilities, etc., however, the individual accumulates access rights to both necessary and unnecessary resources. Over time, the individual may accumulate a substantial number of access rights, many of which are no longer needed for the individual's current job function. As the individual accumulates access rights, the security footprint of the individual increases, thereby leaving the resources of the organization more vulnerable to security threats.

Conventionally, organizations have addressed the accumulation of access by engaging information technology (IT) personnel to re-provision the access rights to remove rights that are no longer needed by the individual. Given the expense and time associated with re-provisioning, the re-provisioning of the access rights for an entire group of individuals may be performed periodically at the same time as part of a security protocol of the organization rather than on an ad hoc basis. In certain situations, the organization may opt to tolerate the security risks associated with the individual's larger user footprint between the periodic re-provisioning. Where the resource is highly sensitive, however, such risks may be significant.

SUMMARY OF THE INVENTION

A method, system and computer-usable medium for providing security friction to a request for access to a resource based on whether the access request is atypical. In certain embodiments, a request to access the resource based on a user identity is received electronically. The system determines whether the request is typical or atypical. If the request is typical, access to the requested resource is granted. However, if the request is atypical, access to the requested resource is only allowed if the correct information is provided in response to one or more access control methods that provide an amount of security friction. In certain embodiments, an elapsed time between access requests using the user identity is employed to determine whether the access request is atypical.

In certain embodiments, the system also determines a degree to which the request is atypical and provides different degrees of security friction corresponding to the degree of atypicality. In certain embodiments, access control methods providing high degrees of security friction are used for requests having high degrees of atypicality, while access control methods providing low degrees of security friction are used for requests having low degrees of atypicality.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
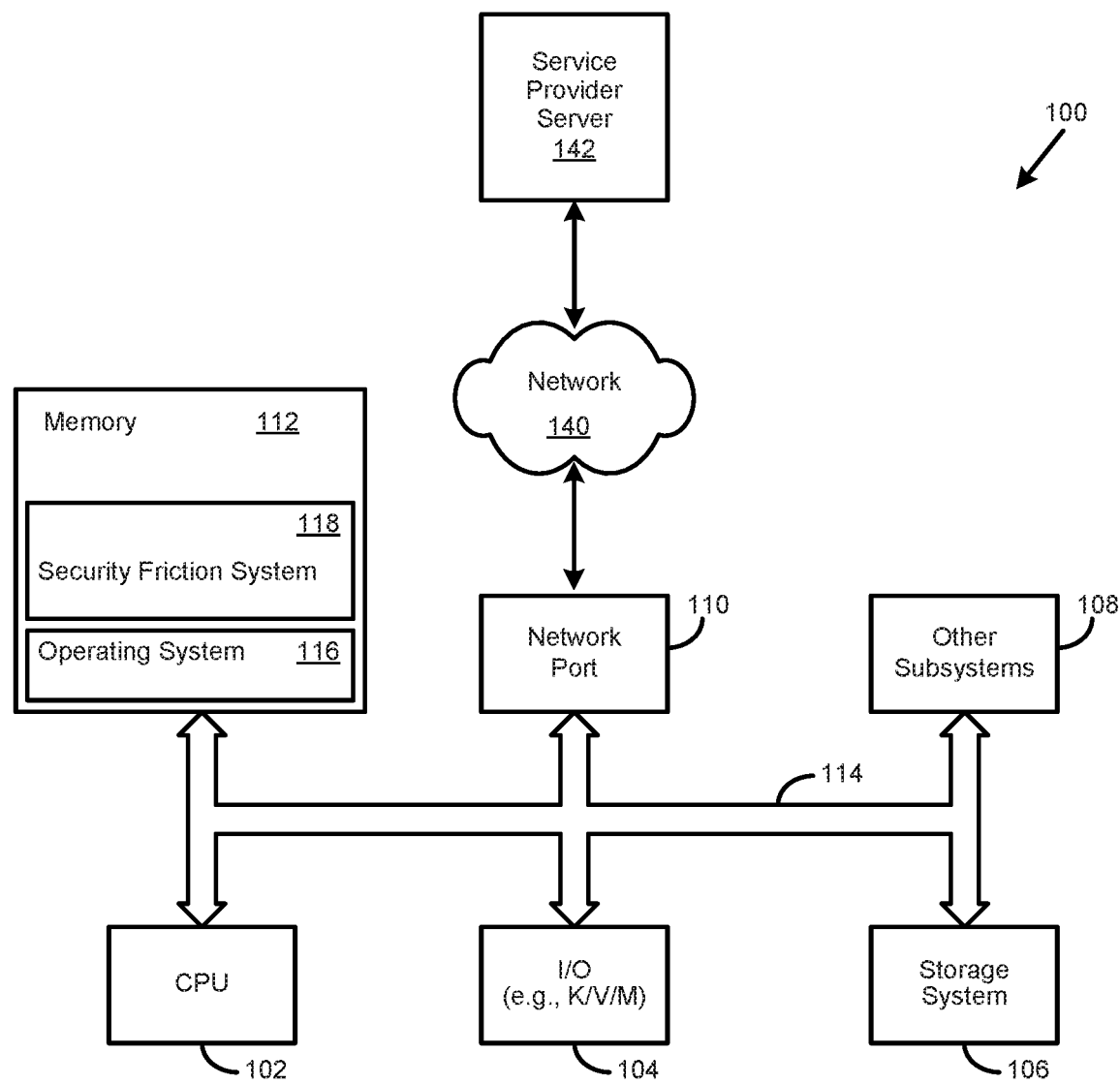
FIG. 1 depicts a generalized illustration of an information handling system that can implement the system and method of the present invention.

A method, system and computer-usable medium are disclosed in the context of an information handling system that provides security friction before a user is allowed to access a resource when a request for the resource is atypical. A request may be considered atypical when the request deviates from an accepted norm or threshold. In a conventional system, access to the resource is often granted without any security friction regardless of whether the request is atypical provided the user has access rights to the resource. In other conventional systems, access to the resource may be granted with a minimal amount of security friction provided the user has access rights to the resource, regardless of whether the request is atypical. In such conventional systems, the system makes no distinction between typical and atypical resource requests. In contrast, in certain embodiments of the disclosed system, security friction is used when the request is determined to be atypical. The security friction asserted for an atypical request is greater than the security friction, if any, asserted for atypical request. In certain embodiments, the amount of security friction may correspond to the degree to which a request is atypical, where high degrees of security friction are used for requests having high degrees of atypicality, and low degrees of security friction are used for requests having lower degrees of atypicality. In certain embodiments, the degree of security friction is changed by varying the access control methods that the user must respond to before access to the resource can be granted.

As used herein, security friction broadly refers to the obstacles encountered when a user interacts with an information handling system before the user can be granted access to the resource by the system. The degree of security friction may be varied by implementing different access control methods for different degrees of security friction. Such access control methods include, but are not limited to, requesting a user name, requesting a password, requesting answers to one or more security questions, requesting an interaction to distinguish human from machine input, requesting biometric data from a user operated biometric sensor, or requesting entry of a reason the user is requesting access to the resource. Higher amounts of security friction may be introduced by using multi-factor access control methods and/or asserting access control methods requiring a high degree of user interaction with the information handling system.

As used herein, a resource broadly refers to any asset, where access to the asset is restricted to a limited number of authorized users. In various embodiments, resources may include datastores, computer services, computer, or physical facilities. As used herein, datastores may include, without limitation, files or documents, data from end user database applications, databases, email, voicemail, video files, user profiles, client information, or the random data property of an organization or an information system. Datastore data may be structured, unstructured or in another electronic format and may be classified as an application-specific datastore, operational datastore, or centralized datastore. A datastore may be designed and implemented by using proprietary software or through typical database applications.

As used herein, a computer service broadly refers to any combination of software or hardware that provides a benefit to the user when accessed. Computer services include, without limitation, email services, cloud services, web services, storage services, or application services.

As used herein, a computer system broadly includes an information handling system and includes corresponding hardware or software. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, and various input and output (I/O) devices, such as a keyboard, a mouse, and a graphics display.

Providing a degree of security friction for atypical requests deters unauthorized and/or malicious attempts to access the resource in several manners certain instances, unauthorized and/or malicious requesters may have credential information sufficient to meet a default degree of security friction but lack the information needed to meet the higher degree of security friction triggered when the request is atypical. Absent the additional credential information, the unauthorized and/or malicious requester is denied access to the requested resource. In other instances, unauthorized and/or malicious access requests are deterred since atypical requests raise the likelihood of detection by flagging the atypical request and logging the request for a forensic investigation that may identify the source of the request.

In still further instances, there may be a valid reason to grant the user's request notwithstanding the determination that the request is atypical. Unlike the unauthorized and/or malicious requester, the authentic user has all of the credential information needed to gain access to the resource and is only somewhat inconvenienced by the higher degree of security friction. Malicious access is deterred while valid access comes only at a cost of some user inconvenience.

In some embodiments, a request is considered atypical when a user having access rights to a resource has not exercised those rights for a certain time. A long elapsed time between requests may indicate that the user's access rights have been compromised by a malicious entity or are being employed by the user for a malicious purpose. As used herein, an entity broadly refers to something that exists as itself, whether physically or abstractly. In certain embodiments, an entity may be an individual user, a group, an organization, or a government. In certain embodiments, an entity may be a device, such as endpoint and edge devices, a network, a domain, an operation, or a process.

Various technical advantages of embodiments using the elapsed time between requests as an indicator of atypicality may be understood with respect to the following example. In this example, User 'A' is granted rights to files in several directories on a server for a highly confidential project. User 'A' uses these rights regularly while on the project but ceases using the rights regularly after moving off the project (e.g., once the project has been completed). Unless IT personnel immediately de-provision the access rights to the highly confidential resources upon the project's completion, User 'A' retains the access rights to the resources of that project.

Since User 'A' no longer works on the project, User 'A' no longer has a need to access the highly confidential resources of the project. Any attempts to access the resources of the project may be suspicious. For example, assume an entity identifying itself as User 'A' attempts to access the highly confidential resources of the project using default identification credentials for User 'A' after a substantial period of time has elapsed since the last access by User 'A.' In a conventional system, access is granted without any security friction and the requester is given access to the files notwithstanding that the access rights have not been used for a long period of time. While it is possible to detect that User 'A' is using rights that User 'A' rarely uses using analytics, there is a deterrent and protective effect in adding a degree of security friction for this atypical request. Security friction may be implemented by, among other manners, using one or more user authentication methods. For example, the system could prompt User 'A' to enter a username and password. Additionally, or in the alternative, the system could prompt User 'A' to enter one or more sentences indicating the reason User 'A' wishes to access the highly confidential resources. In certain embodiments, the system could request User 'A' to solve a capture to distinguish human from robotic entry. In certain embodiments, the system could prompt User 'A' to answer one or more security questions. In certain embodiments, the system may prompt User 'A' to operate a biometric sensor to obtain biometric data from User 'A.' If the entity using the user identity for User 'A' fails to provide the correct information for the requested authentication, the entity is denied access to the highly confidential resource.

There are several scenarios showing the technical advantage of a system employing the foregoing security friction to atypical requests. In a first scenario, the machine used by User 'A' is infected with malware. In a second scenario, the account of User 'A' has been compromised by an attacker that has some, but not all, of the identification credentials for User 'A' (e.g., only the username and password). In a third scenario, the account of User 'A' has been compromised by an attacker who does not have the password identification credentials of User 'A.' This third scenario may occur when the malicious attacker is a remote access Trojan or similar threat. In a fourth scenario, User 'A' is an authorized user but is collecting data for malicious purposes. In a fifth scenario, User 'A' is legitimately accessing the data for a job-related purpose.

In each scenario, one or more user authentication methods may be used to provide security friction to grant or deny access to the highly confidential resource. In the first scenario, the malware cannot establish a CAPTCHA or similar user authentication method for distinguishing between human and computer generated input. Access to the resource is declined and the incomplete access is logged for subsequent forensic analysis. In the second scenario, the attacker enters the password for User 'A' but must leave a business justification. This leaves yet another forensic trail and increases the attacker's risk of discovery. The potential for discovery is a deterrent since a forensic trail is established that may lead to the identification of the source of the unauthorized request. In the third scenario, the attacker cannot access the data and leaves a history of an unusual and incomplete access. The unusual and incomplete access could drive an analytic in the user and entity behavior analytics that the account of User 'A' has been compromised. In the fourth scenario, a request for access to the resource is noted in a way that is obvious to User 'A.' If the entity requesting access to the resource is indeed User 'A,' then User 'A' is made aware that his/her access request has been logged. This will deter User 'A' from requesting access to resources no longer necessary for his/her job functions since User 'A' now knows such requests are being tracked in the security system. In the fifth scenario, User 'A' can provide all of the correct information for the user authentication methods and is granted access to the resource. User 'A' has merely experienced security friction for the access request. In each scenario, adding security friction to an atypical request reduces the risk that a resource will be compromised.

FIG. 1 is a generalized illustration of an information handling system 100 that can implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security friction system 118. In one embodiment, the information handling system 100 can download the security friction system 118 from the service provider server 142. In another embodiment, the security friction system 118 is provided as a service from the service provider server 142.

In various embodiments, the security friction system 118 performs a detection operation to determine whether a particular resource request associated with a given user is typical or atypical. In certain embodiments, the user may be granted access to the resource without security friction if the request is typical. If the request is atypical, the security friction system 118 introduces an amount of security friction requiring correct responses from the requester before access to the resource may be granted. In certain embodiments, if the request is typical, the security friction system 118 authenticates access to the requested resource using one or more user authentication methods to provide a first degree of security friction prior to granting or denying access to the requested resource. If the request is atypical, the security friction system 118 authenticates access to the requested resource using one or more user authentication methods to provide a second degree of security friction before granting or denying access to the requested resource. In certain embodiments, the second degree of security friction is higher than the first degree of security friction.

As will be appreciated, once the information handling system 100 is configured to perform the security friction operations, the information handling system 100 becomes a specialized computing device specifically configured to perform the acceptable, anomalous, or malicious behavior detection operation (i.e., a specialized user-centric information handling system) and is not a general purpose computing device. Moreover, the implementation of the security friction system 118 on the information handling system 100 improves the functionality of the information handling system 100 and provides a useful and concrete result of automatically detecting acceptable, anomalous, and malicious behavior associated with a user.

Figure 2:
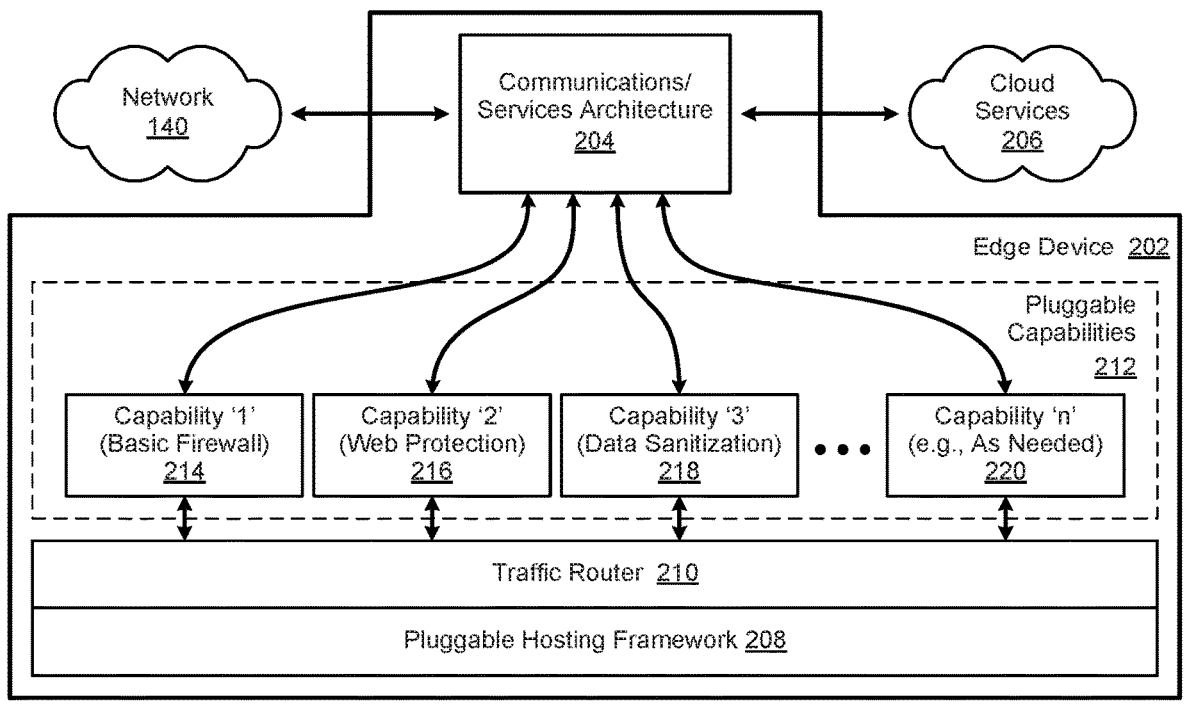
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as needed basis. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
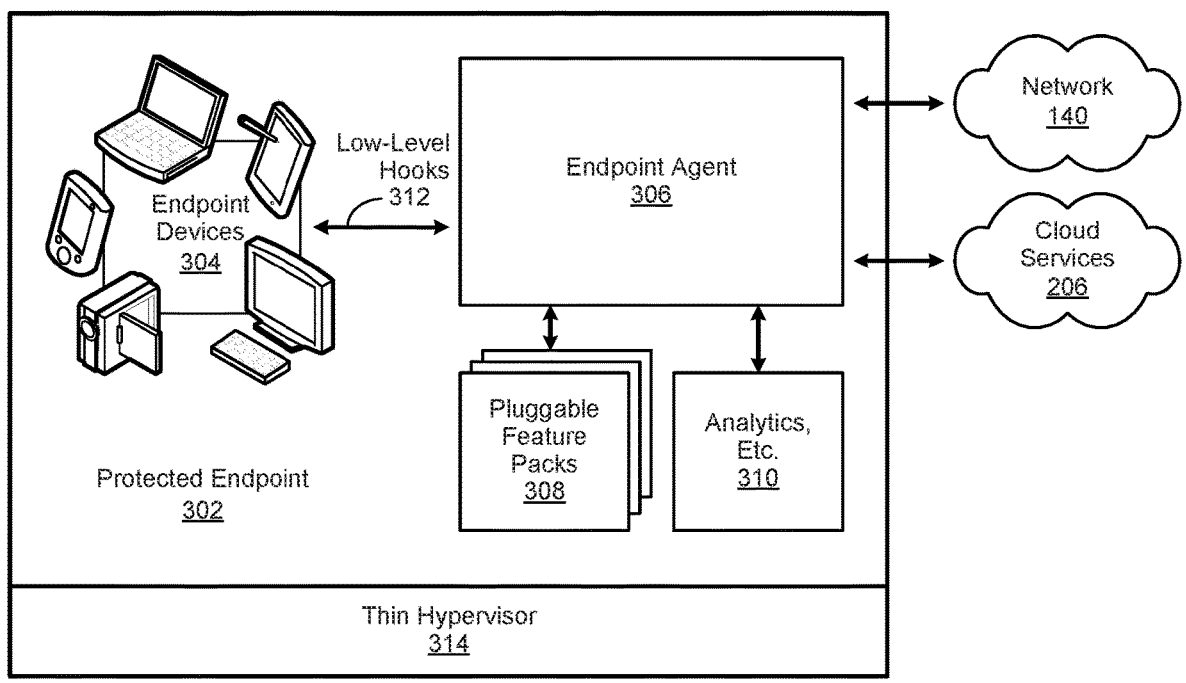
FIG. 3 is a simplified block diagram of an endpoint agent.

FIG. 3 is a simplified block diagram of an endpoint agent that may be used in certain embodiments of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernible by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 may be implemented to perform operations associated with analyzing the probability distribution of features associated with certain interrelated events, as described in greater detail herein. In various embodiments, the protected endpoint may be implemented to collect and provide certain information associated with an event, described in greater detail herein. In certain embodiments, the protected endpoint 302 may be implemented to provide temporal information, such as time-stamp information, associated with such operations.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with analyzing probability distributions of interrelated event features in real time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 may be invoked by the endpoint agent 306 according to the occurrence of a particular user behavior. In certain embodiments, the individual features of a pluggable feature pack 308 may be invoked by the endpoint agent 306 according to the occurrence of a particular event. In certain embodiments, the individual features of a pluggable feature pack 308 may be invoked by the endpoint agent 306 at a particular point in time. In these embodiments, the method by which a given user behavior, event, or point in time is selected is a matter of design choice.

In certain embodiments, the individual features of a pluggable feature pack 308 may be invoked by e endpoint agent 306 according to the context of a particular user behavior or resource access request. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors.

In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
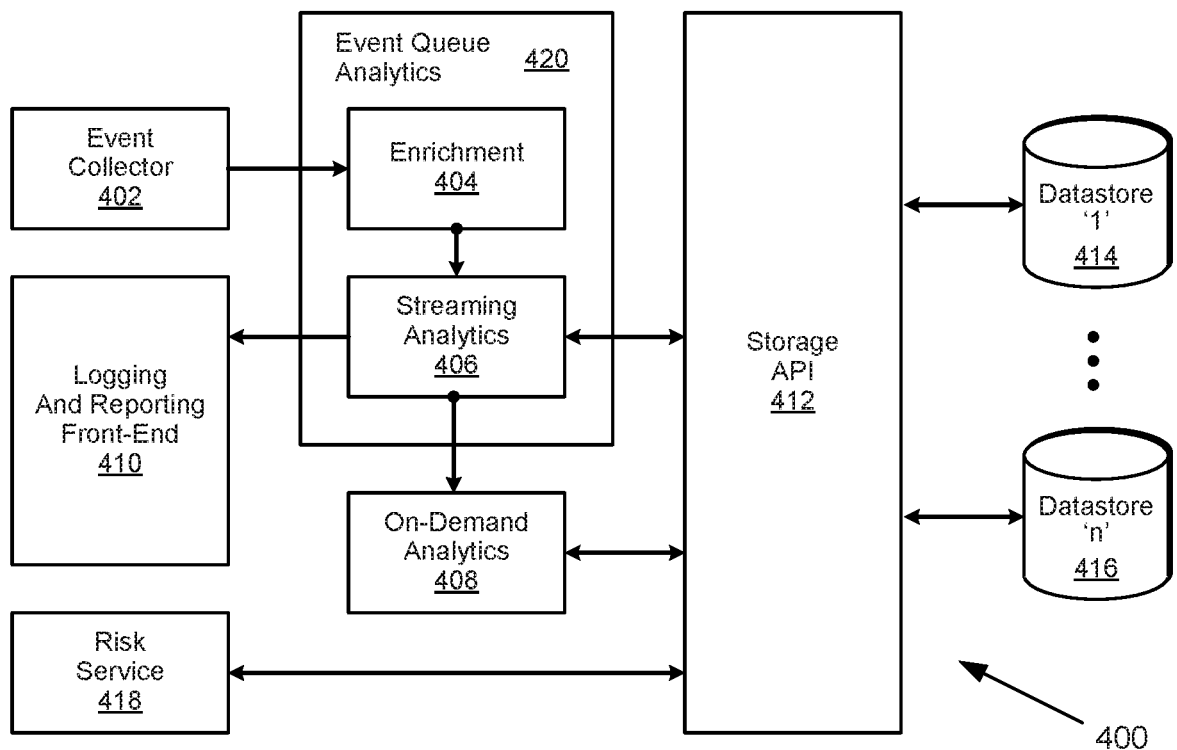
FIG. 4 is a simplified block diagram of a security analytics system.

FIG. 4 is a simplified block diagram of a security analytics system 400 that may be used in certain embodiments of the invention. In certain examples, the security analytics system shown in FIG. 4 may be implemented to provide log storage, reporting, and analytics capable of performing streaming 406 and on-demand 408 analytics operations. In certain embodiments, such operations may be associated with defining and managing a user profile. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received. In certain embodiments, the enriched user behavior information may be associated with a particular event. In certain embodiments, the enrichment 404 and streaming analytics 406 modules may be implemented to perform event queue analytics 420 operations, as described in greater detail herein.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with defining and managing a user profile. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416, including information relating to resource access requests made by a user using a particular user identity. Skilled practitioners of the art will recognize that many such embodiments are possible. Accordingly, the foregoing is not intended to limit the spirit, scope or intent of the invention.

Figure 5:
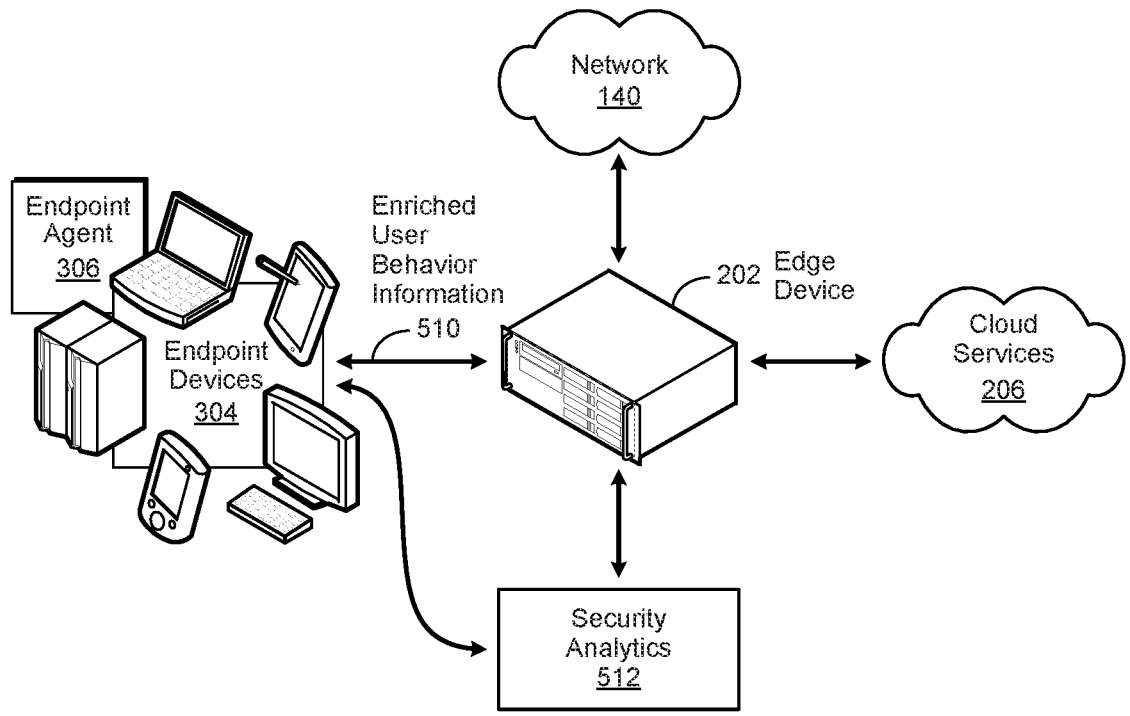
FIG. 5 is a simplified block diagram of an environment in which a security analytics system may operate.

FIG. 5 is a simplified block diagram of one environment in which a security analytics system may operate. In certain embodiments, the security analytics system 512 may be implemented to determine the amount of security friction that is to be utilized in response to a user's resource request. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various resource access requests. In certain embodiments, the request may be wrapped and then handled by proxy. In certain embodiments, a small packet of contextual information associated with a user behavior may be sent with a resource access request. In certain embodiments, service requests may be related to Domain Name Service (DNS), web browsing activity, email, and so forth, all of which are essentially requests for service by an endpoint device 304. In certain embodiments, such service requests may be associated with temporal event information. Consequently, such requests can be enriched by the addition of user behavior contextual information (e.g., UserAccount, interactive/automated, data-touched, temporal event information, etc.). Accordingly, the edge device 202 can then use this information to manage the appropriate amount of security friction that is to be asserted in response to the resource access requests.

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be oriented to controlling security friction associated with resource requests involving, for example, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

As another example, the security analytics system 512 may be implemented to perform risk scoring processes to decide whether to assert security friction. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker through the assertion of security friction.

Figure 6A:
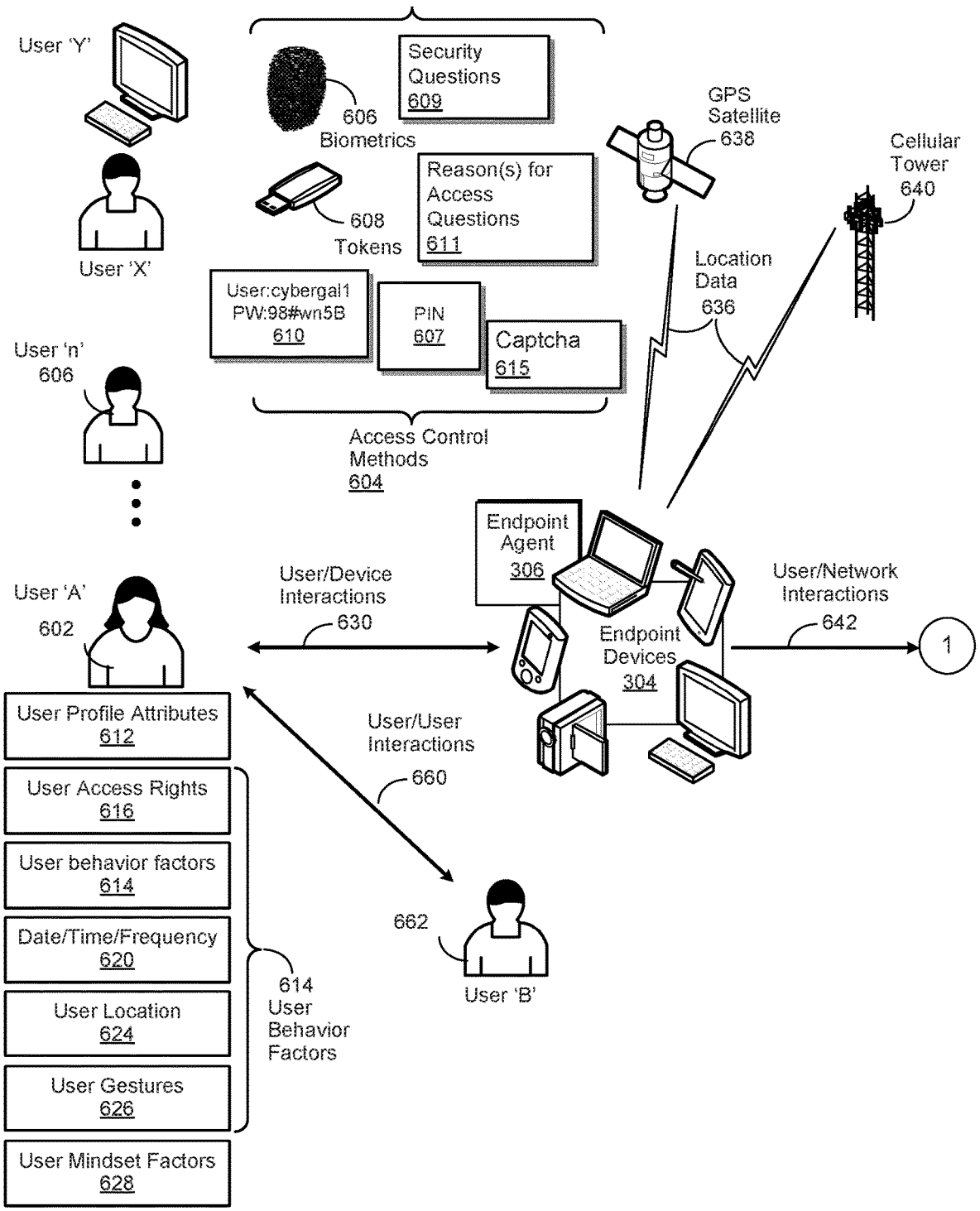
FIGS. 6a and 6b depict a simplified diagram of an electronic environment employing a security friction system.
Figure 6B:
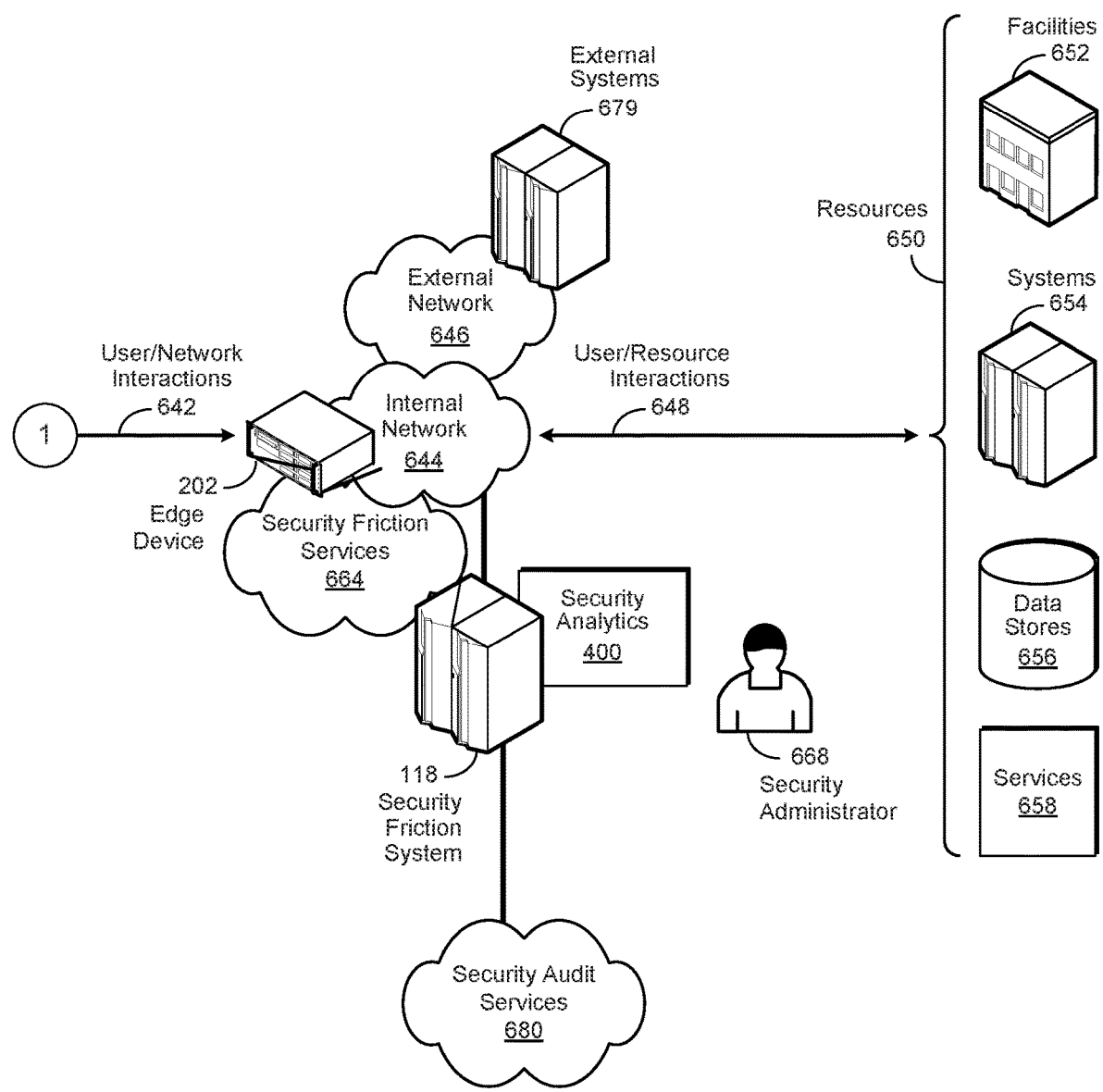

FIG. 6 is a simplified block diagram of an environment in which the security friction system 118 may operate. In certain embodiments, the security friction system 118 may be implemented to analyze resource requests received at one or more edge devices 202. In certain embodiments, analyses performed by the security friction system 118 may be used to identify anomalous, abnormal, unexpected or malicious behavior associated with a user. In certain embodiments, the anomalous, abnormal, unexpected or malicious behavior may be identified at a particular point in time, during the occurrence of an event, the enactment of a user behavior, or a combination thereof.

In certain embodiments, the security friction system 118 may use information associated with a user identity that is stored in a user profile. As used herein, a user profile broadly refers to a collection of information that uniquely describes a user's identity and their associated behavior, whether the behavior occurs within a physical realm or cyberspace. In certain embodiments, as described in greater detail herein, the user profile may include user profile attributes 612, user behavior factors 614, user mindset factors 628, or a combination thereof.

As used herein, a user profile attribute 612 broadly refers to data or metadata that can be used, individually or in combination with other user profile attributes 612, to uniquely ascertain the identity of a user. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth.

In certain embodiments, one or more access control methods 604 are used by the security friction system 118 to assert security friction in response to atypical resource requests. In certain embodiments, the access control methods 604 are specific to a given user and may include a user's biometrics 606, an associated security token 608, (e.g., a dongle containing cryptographic keys), a user identifier/password (ID/PW) 610, or security questions 609 unique to the user, such as those that may require the user to enter SPI. In certain embodiments, the access control methods 604 include prompting for reasons that a user is requesting access to a resource 611. Still further access control methods may include control methods that distinguish between human and machine entry of information, such as Captcha 615.

In certain embodiments, the access control methods 604 may be used in combination to perform multi-factor access control. As used herein, multi-factor access control broadly refers to approaches requiring correct responses to two or more access control methods before access to the resource can be granted.

In certain embodiments, changes in the user behavior associated with a user identity may be used to determine whether a resource request is to be treated as anomalous. In certain embodiments, the user behavior and/or other information may be combined to determine a security risk level for the user identity. Large changes in security risk levels between resource access requests may indicate that the user should not be allowed to access the resource without a certain degree of security friction.

As used herein, a user behavior factor 614 broadly refers to information associated with a user's behavior, whether the behavior occurs within a physical realm or cyberspace. In certain embodiments, user behavior factors 614 may include the user's access rights 616, the user's interactions 618, and the date/time/frequency 620 of when the interactions 618 are enacted. In certain embodiments, the user behavior factors 614 may likewise include the user's location 624, and the gestures 626 used to enact the interactions 618.

In certain embodiments, the user gestures 626 may include key strokes on a keypad, a cursor movement, a mouse movement or click, a finger swipe, tap, or other hand gesture, an eye movement, or some combination thereof. In certain embodiments, the user gestures 626 may likewise include the cadence of the user's keystrokes, the motion, force and duration of a hand or finger gesture, the rapidity and direction of various eye movements, or some combination thereof. In certain embodiments, the user gestures 626 may include various audio or verbal commands performed by the user.

In various embodiments, certain date/time/frequency 620 behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 628, or a combination thereof, to one or more instants in time. As an example, user 'A' 602 may access a system 854 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 662 at 3:49 PM that same day. Furthermore, there is no record in their user behavior profile that user 'A' 602 has ever communicated with user 'B' 662 in the past. Moreover, it may be determined that user 'B' 662 is employed by a competitor. Accordingly, the correlation of user 'A' 602 downloading the customer list at one point in time, and then forwarding the customer list to user 'B' 662 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 662, user 'A' 602 leaves for a two week vacation. Upon their return, they forward the previously-downloaded customer list to user 'B' 662 at 9:14 AM on Nov. 20, 2017. From an ontological time perspective, it has been two weeks since user 'A' 602 accessed a system 654 to download the customer list. However, from a societal time perspective, they have still forwarded the customer list to user 'B' 662, despite two weeks having elapsed since the customer list was originally downloaded.

Accordingly, the correlation of user 'A' 602 downloading the customer list at one point in time, and then forwarding the customer list to user 'B' 662 at a much later point in time, is another example of societal time. More particularly, it may be inferred that the intent of user 'A' 602 did not changed during the two weeks they were on vacation. Furthermore, user 'A' 602 may have attempted to mask an intended malicious act by letting some period of time elapse between the time they originally downloaded the customer list and when they eventually forwarded it to user 'B' 662. From the foregoing, those of skill in the art will recognize that the use of societal time may be advantageous in determining whether a particular user behavior is acceptable, anomalous, abnormal, unexpected or malicious.

As used herein, mindset factors 628 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 628 may include a personality type. Examples of known approaches for determining a personality type 624 include Jungian types, Myers-Briggs type indicators, Keirsy Temperament Sorter, Socionics, Enneagram of Personality, and Eyseneck's three-factor model.

In certain embodiments, the mindset factors 628 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

In certain instances, various user behavior factors 614, such as user gestures 626, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal 644 or external 646 network, capable of supporting communication between two or more entities. In certain embodiments, the external network 646 may be used to access external systems 679. In certain embodiments, the entity may be a user, an endpoint device 304, or various resources, described in greater detail herein. In certain embodiments, the entities may include various endpoint devices 304 or resources 650 operating at the behest of an entity, such as a user. In certain embodiments, the communication between the entities may include audio, image, video, text, or binary data.

In certain embodiments, the contextual information may include a user's authentication factors associated with access control methods 604. In certain embodiments, contextual information may likewise include various user identity resolution factors, such as personal information associated with the user, the date/time/frequency 620 of various user behavior, the user's location 624, the user's role or position in an organization, their associated access rights 616, and certain user gestures 626 employed by the user in the enactment of a user behavior. Other contextual information may likewise include various user interactions, whether the interactions are with an endpoint device 304, a network 140, a resource 650, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis that may affect whether security friction is asserted in response to a user's request to access a resource. In certain embodiments, the user behavior analysis may be performed by the security analytics system 512. In certain embodiments, the security analytics system 512 may be implemented to process a user profile and certain correlated contextual information associated with a user to determine their mental state at a particular point in time. In certain embodiments, the mental state of a user at a particular point in time may be used in combination with various user profile attributes 612 and user behavior factors 614, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 602, will be uniquely different and distinct from another user, such as user 'B' 662. Accordingly, user profile '1' will uniquely reflect the user behavior of user '1', just as user profile 'n' will uniquely reflect the user behavior of user 'n.' As an example, user 'A' 602 may have a user profile attribute 612 of sales administrator. Upon arriving at their office in the morning, the user consistently checks their email, item by item, responding to each in turn, followed by processing expense reports for field sales personnel. Then, after lunch, the user may access and review sales forecasts on an internal system 654. Furthermore, the user may exhibit sporadic keyboard entry interspersed with extensive mouse activity, or user gestures 626, when perusing the sales forecasts.

Moreover, personality type information associated with user 'A' 602 may indicate the user consistently exhibits a positive, outgoing attitude. In this example, the sequence of the activities enacted by user 'A' 602 throughout the day, and their frequency, correspond to their expected date/time/frequency 620 user behavior factors 614. Likewise, the keyboard cadence and other user gestures 626 are examples of granular user behavior factors 614, while the personality type information is an example of an abstract user behavior factor 614.

As another example, user 'B' 662 may have a user profile attribute 612 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 654. Additionally, user 'B' 662 may exhibit deliberate keyboard entry interspersed with iterative mouse activity, or user gestures 626, when updating financial information. Moreover, personality type information associated with user 'B' 662 may indicate they consistently exhibit a reserved, introspective and contemplative attitude. As in the prior example, the sequence of the activities enacted by user 'B' 662 throughout the day, and their frequency, correspond to their expected date/time/frequency 620 user behavior factors 614. Likewise, as before, the keyboard cadence and other user gestures 626 are examples of granular user behavior factors 614, while the personality type information is an example of an abstract user behavior factor 614.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 650 in the first month in the position, but by the sixth month, such access and interaction is commonplace and routine.

In certain examples, a user behavior factor 614 associated with a particular user, such as user 'A' 602 or 'B' 662, may be used by the security friction system 118 to compare the user's current user behavior to past user behavior. If the user's current user behavior matches their past user behavior, then the security friction system 118 may determine that the user's behavior is acceptable for the purposes of granting the user's request for access to resource. If not, then the security friction system 118 may determine that the user's user behavior is anomalous, abnormal, unexpected or malicious, and that the corresponding resource request is atypical.

However, as described in greater detail herein, a change in a particular user's user behavior over time may not be anomalous, abnormal, unexpected, or malicious. Instead, it may be acceptable behavior that simply evolves over time as a natural result of day-to-day user/device 630, user/network 642, user/resource 648, or user/user 660 interactions. In certain embodiments, the security friction system 118 may be implemented to determine whether such changes in a user's user behavior over time are acceptable, anomalous, abnormal, unexpected or malicious. In certain embodiments, a user behavior profile may be implemented in combination with the security friction system 118 to make this temporal determination.

It will be appreciated that anomalous, abnormal, unexpected or malicious user behavior may include inadvertent or compromised user behavior. For example, the user may have innocently mis-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

Likewise, the security friction system 118 may determine the user's user behavior to be malicious and assert an amount of security friction in response to a resource request. As yet another example, an impostor may be attempting to pose as a legitimate user in an attempt to exploit one or more resources 650. In this example, the attempt to exploit one or more resources 650 is malicious user behavior. As yet still another example, a legitimate user may be attempting to increase their level of access to one or more resources 650. In this example, the user's attempt to increase their level of access may indicate malicious user behavior.

To further extend these examples, such resources 650 may include various facilities 652, systems 654, data stores 656, or services 658. In certain embodiments, the security friction system 118 may be implemented to completely block a user's request to access a resource if it is determined their user behavior is anomalous, abnormal, unexpected or malicious.

In certain embodiments, the endpoint device 304 may be used to communicate data through the use of an internal network 644, an external network 646, or a combination thereof. In certain embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 648 interactions may include interactions with various resources 650. In certain embodiments, the resources 650 may include various facilities 652 and systems 654, either of which may be physical or virtual, as well as data stores 656 and services 658. In certain embodiments, the user/user 660 interactions may include interactions between two or more users, such as user 'A' 602 and 'B' 662. In certain embodiments, the user/user interactions 660 may be physical, such as a face-to-face meeting, via a user/device 630 interaction, a user/network 642 interaction, a user/resource 648 interaction, or some combination thereof.

In certain embodiments, the user/user 660 interaction may include a face-to-face verbal exchange between two users. In certain embodiments, the user/user 660 interaction may include a written exchange, such as text written on a sheet of paper, between two users. In certain embodiments, the user/user 660 interaction may include a face-to-face exchange of gestures, such as a sign language exchange, between two users. In certain embodiments, temporal event information associated with various interactions 630, 642, 648, 660 may be collected and used to define and manage a user profile.

In certain embodiments, the security friction system 118 may be implemented to assert security friction within a physical domain or cyberspace environment. In certain embodiments, the security friction may occur during various user interactions, such as user/device 630, user/network 642, and user/resource 648.

In certain embodiments, the security friction system 118 may monitor cyber behavior of various kinds to identify resource requests within an internal 644 network. As an example, the cyber behavior within an internal 644 network may include a user accessing a particular internal system 654 or data store 656. In certain embodiments, the point of observation may include cyber behavior of various kinds within an external 646 network. As an example, the cyber behavior within an external 646 network may include a user's social media activities or participation in certain user forums. Those of skill in the art will recognize that many such examples of user/device 630, user/network 642, and user/resource 648 are possible. Accordingly, the foregoing is not intended to limit the spirit, scope or intent of the invention.

In certain embodiments, the security friction system 118 may be implemented to process certain contextual information to ascertain the identity of an entity at a particular point in time. In certain embodiments, the contextual information may include location data 636. In certain embodiments, the endpoint device 304 may be configured to receive such location data 636, which is used as a data source for determining the user's location 824.

In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint 304 or edge device 202. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 652 or system 854. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the security friction system 118 may be implemented as a stand-alone system. In certain embodiments, the security friction system 118 may be implemented as a distributed system. In certain embodiment, the security friction system 118 may be implemented as a virtual system, such as an instantiation of one or more virtual machines (VMs). In certain embodiments, the security friction system 118 may be implemented to use various event data stored in a repository of persistent event data 670 to provide security friction to atypical resource access requests. In certain embodiments, the security friction system 118 may be implemented as a security friction service 664. Those of skill in the art will recognize that many such embodiments are possible. Accordingly, the foregoing is not intended to limit the spirit, scope or intent of the invention.

In certain embodiments, the security friction system 118 may be implemented as a security friction service 664. In certain embodiments, the security friction service 664 may be implemented in a cloud environment familiar to those of skill in the art. Those of skill in the art will recognize that many such embodiments are possible. Accordingly, the foregoing is not intended to limit the spirit, scope or intent of the invention.

In certain embodiments, users, such as User 'A' 602 through User 'n' 606, interact with endpoint devices 304 to communicate with one or more edge devices 202. In certain embodiments, the edge device 202 is configured to control access to one or more resources 210. Exemplary resources may include electronic interfaces used to access physical facilities 652, computer systems 654, data stores 656, and application services 658.

In certain embodiments, the security friction system 118 monitors user resource requests received at the edge device 202 from the user devices 202 to minimize security breaches. Sometimes, the endpoint devices 304 may be operated by authorized system users, such as User 'A' through User 'n,' having access rights to the requested resource. In other instances, a malicious human entity User 'X' or malicious machine entity User 'Y' may attempt to improperly gain access to the resources by imitating an existing authorized user or through other inappropriate means. The security friction system 118 attempts to distinguish between authorized users and questionable/malicious users and imposes security friction for atypical requests as an obstacle to questionable/malicious users.

In certain embodiments, security friction may be imposed using one or more access control methods. Such access control methods may include, but are not limited to, biometrics 606, tokens 608, user names and passwords 610, requesting one or more reasons for access 611, answering security questions 609, PINs 607, and human/machine differentiation methods such as Captcha 615.

In certain embodiments, the security friction system 118 accesses user profile information to determine whether a request is atypical. In certain embodiments, the security friction system 118 may also use information retrieved from security system audit services 680 to distinguish between typical and atypical resource access requests. In certain embodiments, the security friction system may access information relating to acceptable answers to questions regarding reasons for requesting access to a particular resource. Acceptable responses may be based on natural language processing techniques.

Figure 7:
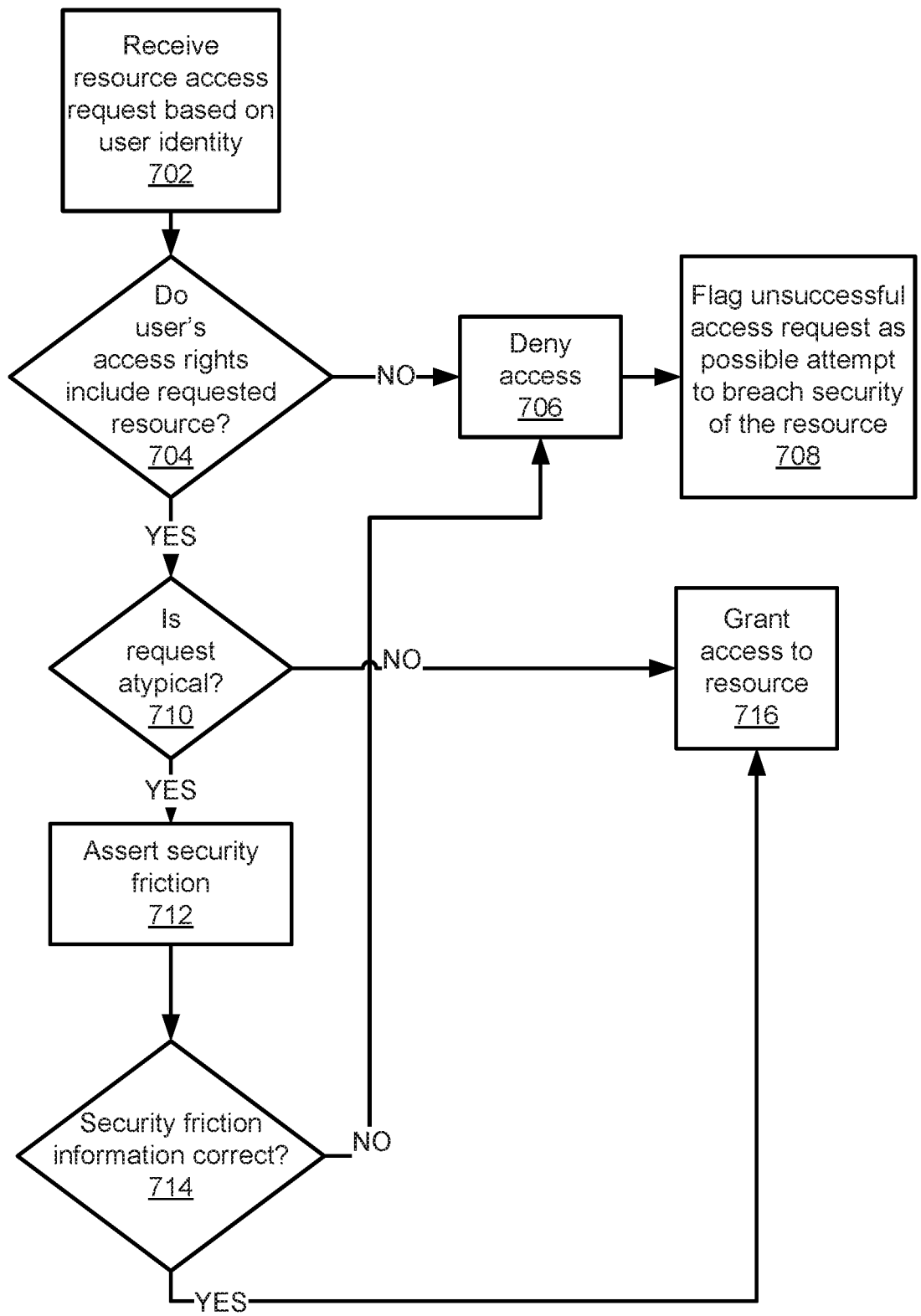
FIG. 7 is a flowchart depicting exemplary operations that may be executed in certain embodiments of the security friction system.

FIG. 7 is a flowchart depicting exemplary operations that may be executed in certain embodiments of the security friction system 118. At operation 702, the security friction system 118 receives a resource access request based on a user identity from an entity. At operation 704, the security friction system 118 checks the user profile associated with the user identity to determine whether the user identified in the request has access rights that include the requested resource. If the user profile does not include access rights to the requested resource, access to the resource is denied at operation 706 and the request is flagged at operation 708 as a possible attempt to compromise the security of the resource. In certain embodiments, the unsuccessful request may be electronically reported immediately to a security administrator 668 and/or stored in one or more audit logs of the audit services 680 (see FIG. 6b).

If the user profile of the user identity includes access rights to the resource, the security friction system 118, at operation 710, determines whether the access request is atypical. Determining whether a request is atypical can be a function of any information indicating that one or more parameters of the request deviates from expected norms.

In certain embodiments, the location data for a user is available. Security friction system 118 may compare the current location data with prior location data associated with the user identity making the request. In certain embodiments, the security friction system 118 may determine that the request is atypical if the current location data for the entity making the request does not correspond to the normal locations from which the user identity associated with the request works. In certain embodiments, the security friction system 118 may determine that the request is atypical if multiple access requests are made using the user identity from different locations within a short time of one another thereby indicating that the requests may have originated from separate entities at separate locations. In certain embodiments, the security friction system 118 may determine that the request is atypical if the current location data differs from location data in the user profile corresponding to the user identity. Additionally, or in the alternative, other manners of using location data may be employed to determine whether an access request is atypical.

In certain embodiments, the security friction system 118 may determine that the request is atypical if a software program attempting to access the resource is a software program not typically used to access the resource. For example, a spreadsheet file of type ".xls" is normally accessed using, for example, Microsoft Excel®. If, however, the security friction system determines that the access request is attempting to access the spreadsheet with a program a program other than Microsoft Excel®, the resource request may be treated as atypical and the security friction system 118 asserts an amount security friction in order to grant or deny access to the spreadsheet file.

In certain embodiments, the security friction system 118 may use time information to determine whether an access request is atypical. As used herein, time information broadly refers to any chronological information from which the temporal occurrence of an event may be determined. In certain embodiments, elapsed time may be used as an indicator of atypicality. As used herein, elapsed time broadly refers to a comparison made between two or more events. In certain embodiments, an elapsed time is determined by comparing the time at which the current access request for the resource is received using the user identity with a time at which a prior access request for the resource was requested and/or granted using the user identity. In certain embodiments, the prior access corresponds to the last time an access request for the resource was granted based on the user identity. The security friction system 118 may determine that an access request is atypical if the elapsed time between such requests exceeds a threshold value. In certain embodiments, the security friction system number 118 may determine that a request is atypical when consecutive requests are made within a short elapsed time thereby indicating that the requesting entity is using a brute force methodology to improperly access the resource. In certain embodiments, a degree of atypicality may be assigned to the access request based on the magnitude of the elapsed time. In certain embodiments, the times at which access to a resource is requested and/or granted may be obtained by the security friction system 118 from the audit services 780.

In certain embodiments, various user profile attributes associated with the user identity employed by the requesting entity may be used to determine whether the access request is atypical. In certain embodiments, attributes of the user behavior may be compared with a set of behavior attributes indicating that the user presents a security risk if access to the resource is granted. In certain embodiments, attributes of the user behavior in the current user profile may be compared with a set of attributes in a prior user profile associated with the user identity to determine whether the security risk associated with the user identity has increased, thereby indicating the need for security friction. It will be recognized that other user profile attributes may be utilized by the security friction system 118 to determine whether an access request is atypical.

If the access request employing the user identity is determined to be atypical at operation 710, an amount of security friction is asserted at operation 712. As noted above, security friction may be asserted by implementing one or more user access control methods including, but not limited to, requesting a user name, requesting a password, requesting answers to one or more security questions, requesting an interaction to distinguish human from machine input, requesting biometric data from a user operated biometric sensor, or requesting entry of a reason the user is requesting access to the resource. In certain embodiments, security friction system 118 may prompt the requesting entity to enter information corresponding to non-sensitive personal information, sensitive personal information, or any other user profile attributes.

The security friction system 118 determines whether the security friction information provided by the requesting entity is correct at operation 714. If the information is correct, the requesting entity is granted access to the resource at operation 716. Otherwise, the request is denied at operation 706 and flagged for further investigation at operation 708.

Figure 8:
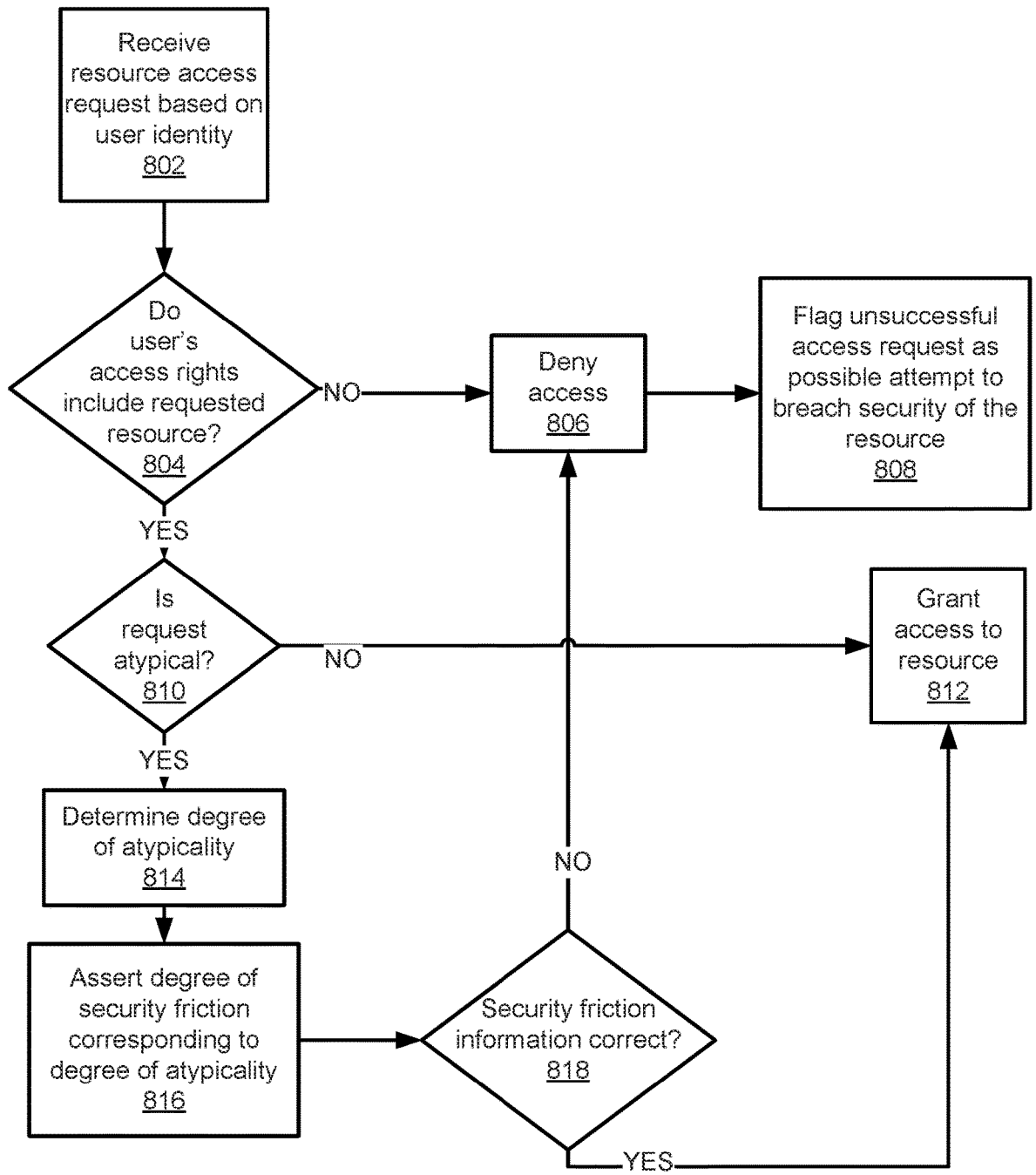
FIG. 8 is another flowchart depicting exemplary operations that may be executed in certain embodiments of the security friction system.

FIG. 8 is another flowchart depicting exemplary operations that may be executed in certain embodiments of the security friction system 118. At operation 802, the security friction system 118 receives a resource access request based on a user identity from an entity. At operation 804, the security friction system 118 checks the user profile associated with the user identity to determine whether the user identified in the request has access rights that include the requested resource. If the user profile does not include access rights to the requested resource, access to the resource is denied at operation 806 and the request is flagged at operation 808 as a possible attempt to compromise the security of the resource. In certain embodiments, the unsuccessful request may be electronically reported immediately to a security administrator 668 and/or stored in one or more audit logs of the audit services 680 (see FIG. 6b).

If the user profile associated with the user identity making the request includes access rights to the resource, the security friction system 118, at operation 810, determines whether the access request is atypical. As described above, a determination of whether a request is atypical can be a function of any information indicating that one or more parameters of the request deviates from expected norms. If the request is not atypical, the requesting entity may be granted access to the resource at operation 812.

If the security friction system 118 determines that the request is atypical, the security friction system determines the degree of atypicality at operation 814. In various embodiments, the degree of atypicality may be determined based on a degree to which the request differs from normal parameters. In certain embodiments, longer elapsed times between requests may be assigned a higher degree of atypicality than shorter elapsed times. In certain embodiments, very short elapsed times between requests may be assigned a high degree of atypicality since short elapsed times may indicate that the resource is under a brute force attack. In certain embodiments, the degree of atypicality may be assigned based on the extent of the differences between the current user profile associated with the user identity making the access request and a prior user profile associated with the user identity. In certain embodiments, the current user profile is the user profile existing when the access request is received, whereas the prior user profile is a user profile existing at a time at which a prior access request using the user identity was received and/or granted. Larger differences between user profile information may be assigned a higher degree of atypicality than fewer differences between the user profiles.

Once the degree of atypicality is determined at operation 814, the security friction system 118 asserts a degree of security friction at operation 816 that corresponds to the degree of atypicality determined at operation 814. As noted above, security friction may be asserted by implementing one or more user access control methods including, but not limited to, requesting a user name, requesting a password, requesting answers to one or more security questions, requesting an interaction to distinguish human from machine input, requesting biometric data from a user operated biometric sensor, or requesting entry of a reason the user is requesting access to the resource. In certain embodiments, security friction system 118 may prompt the requesting entity to enter information corresponding to non-sensitive personal information, sensitive personal information, or any other user profile attributes.

In certain embodiments, higher degrees of security friction are asserted for access requests having high degrees of atypicality while lower degrees of security friction are asserted for access requests having lower degrees of atypicality. The degree of security friction asserted may be varied by selecting access control methods requiring different degrees of user interaction to establish the user's identity.

For access requests having a low degree of atypicality, it may be sufficient to prompt the requesting entity for a user name and/or password. For access requests having a higher degree of atypicality, the security friction system 118 may prompt the requesting entity for non-sensitive personal information included in the corresponding user profile. For access requests having an even higher degree of atypicality, security friction system 118 may prompt the requesting entity for sensitive personal information. Larger degrees of security friction may be asserted using biometrics or tokens.

In various embodiments, the security friction system 118 asserts multi-factor access control methods employing multiple access control methods to set the degree of security friction asserted in response to an atypical request. As used herein, multi-factor access control broadly refers to approaches employing two or more access control methods. In certain embodiments, the multi-factor access control methods for an atypical request having a lower degree of atypicality may include merely prompting the requesting entity for simple information included in the user profile, such as a user ID and password. In certain embodiments, for higher degrees of security friction, the requesting entity may be prompted for biometric and/or token information as well as personal information not typically known by a malicious entity, a user ID and password. In certain embodiments, security friction may be imposed merely by requesting a reason for access from the user or answering a Captcha. As is apparent, a wide range of user access control methods may be combined to provide different degrees of security friction.

The security friction system 118 determines whether the security friction information provided by the requesting entity is correct at operation 818. If the information is correct, the requesting entity may be granted access to the resource at operation 820. Otherwise, the request is denied at operation 806 and flagged at operation 808 for further investigation.

Figure 9:
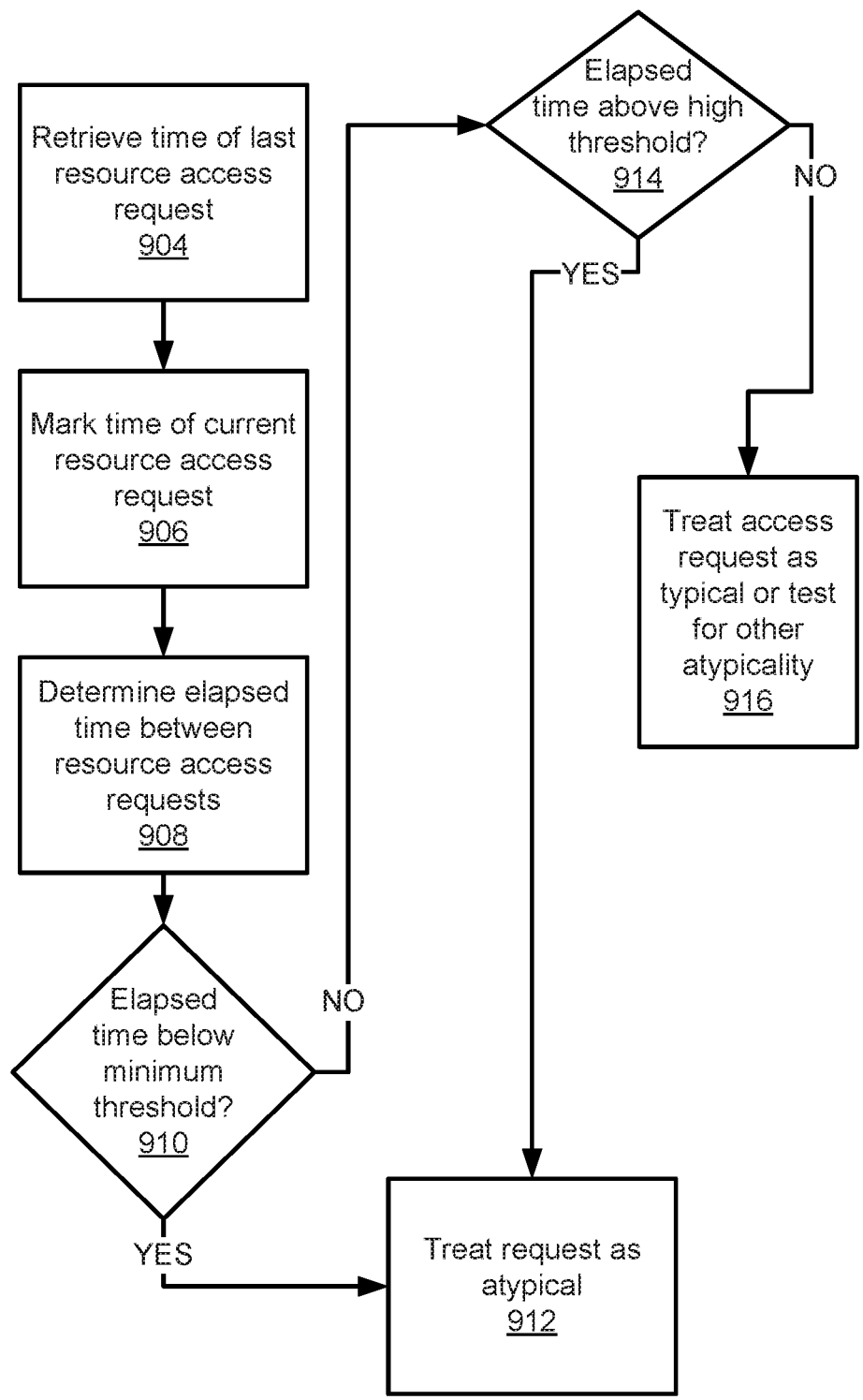
FIG. 9 is a flowchart depicting operations that may be executed by the security friction system to determine whether a request is atypical based on the elapsed time between access requests.

FIG. 9 is a flowchart depicting operations that may be executed by the security friction system 118 to determine whether a request is atypical based on elapsed time. In certain embodiments, the operations in FIG. 9 may be implemented as part of the determination made at operation 710 of FIG. 7.

The determination of atypicality in the example shown in FIG. 9 starts at operation 904, where the security friction system ascertains the time of the last access request for the resource made by an entity employing the user identity. In certain implementations, the security friction system obtains the information corresponding to the time of the last access request from the security system audit services 680 (see FIG. 6*b*). At operation 906, the security friction system marks the time of the current access request for the resource and determines the elapsed time between the resource access requests at operation 908. The elapsed time is compared with a minimum threshold limit at operation 910. If the elapsed time is below the minimum threshold limit, the access request is determined to be atypical at operation 912 and treated as such for assertion of security friction during subsequent operations. The minimum threshold limit corresponds to elapsed times that may occur when the requested resource is the subject of a brute force attack. If the elapsed time is above the minimum threshold limit, the security friction system determines whether the elapsed time is greater than a high threshold limit at operation 914. The high threshold limit indicates that it has been a long time since an entity employing the user ID has accessed or attempted to gain access to the resource thereby indicating that the access request is suspicious. If the elapsed time is greater than the high threshold limit, the access request is determined to be atypical at operation 912. Otherwise, the access request is checked for other types of atypicality or otherwise determined to be typical at operation 916.

Figure 10:
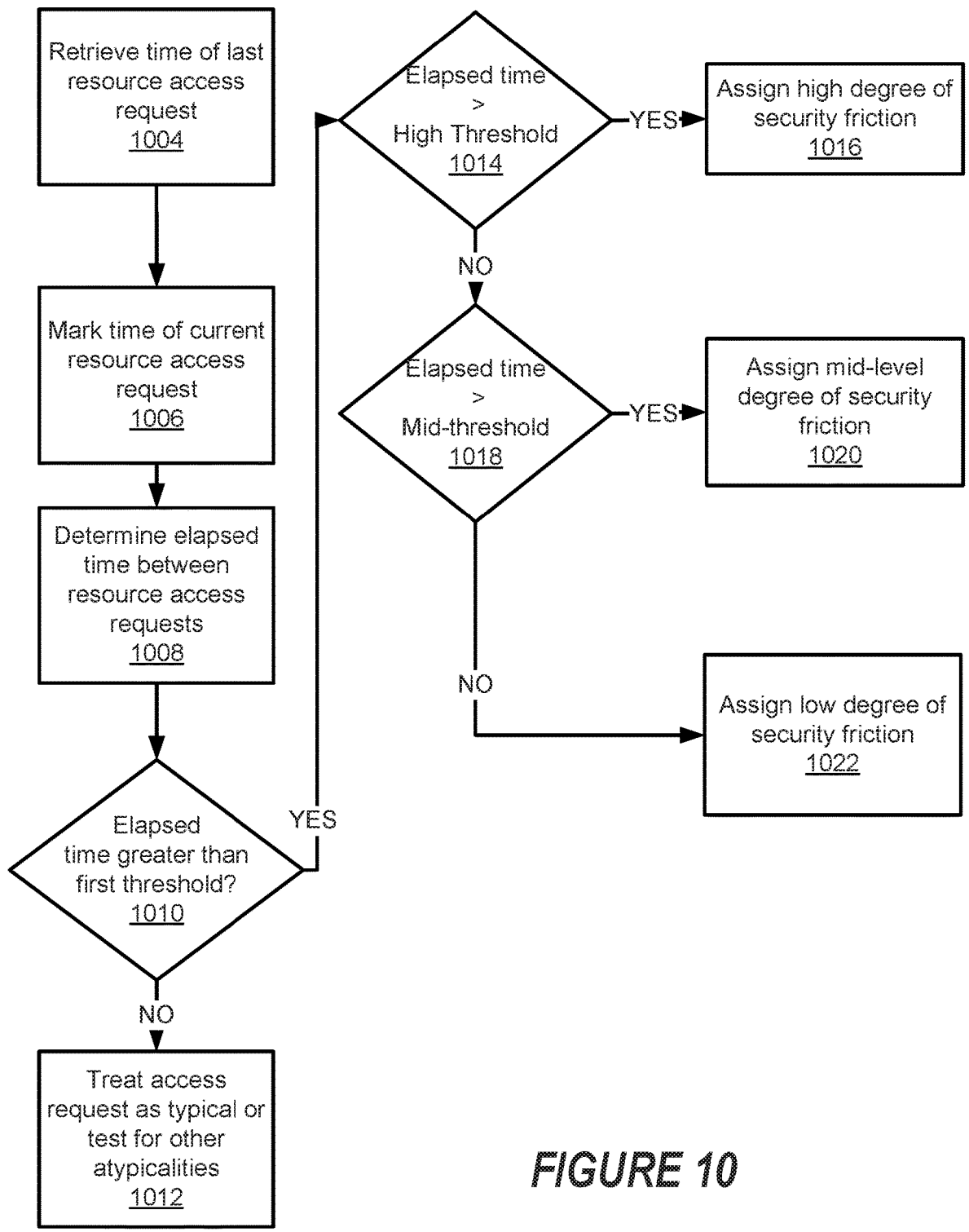
FIG. 10 is a flowchart depicting operations that may be executed by the security friction system to determine whether a request is atypical and the degree to which it is atypical based on the elapsed time between access requests.

FIG. 10 is a flowchart depicting operations that may be executed by the security friction system 118 to determine whether a request is atypical and the degree to which it is atypical based on elapsed time. In certain embodiments, these operations may be used to implement operations 810 and 814 of FIG. 8.

In the example of FIG. 10, only elapsed times larger than certain threshold limits are shown while short elapsed times indicative of a brute force attack have been omitted for simplicity shown. In this example, larger elapsed times are assigned higher degrees of security friction than lower elapsed times.

The determination of atypicality starts at operation 1004, where the security friction system 118 ascertains the time of the last access request for the resource made by an entity employing the user identity. In certain implementations, the security friction system 118 obtains information corresponding to the time of the last access request from the security system audit services 680 (see FIG. 6*b*).

At operation 1006, the security friction system notes the time of the current access request and, at operation 1008, determines the elapsed time between the current and prior resource access requests. The elapsed time is compared with a first threshold limit at operation 1010 to determine whether the elapsed time meets the minimum criterion for atypicality. If not, the access request is treated as typical or is tested for other atypicalities at operation 1012.

If the elapsed time exceeds the minimum threshold limit, the access request is determined to be atypical and the security friction system proceeds to determine the degree of atypicality. The elapsed time is compared with a series of threshold limits to determine the degree of atypicality. Higher degrees of security friction are asserted for higher degrees of atypicality (e.g. larger elapsed times) of the access request.

As shown in FIG. 10, if the elapsed time is less than the minimum threshold limit, the access request is treated as typical or other types of tests for atypicality are applied at operation 1012. However, if the elapsed time is above the minimum threshold limit at operation 1010, the security friction system 118 treats the request as atypical and proceeds to determine the degree of atypicality by comparing the elapsed time to a high threshold limit at operation 1014. The high threshold limit indicates that it has been a long time since an entity employing the user ID has accessed or attempted to gain access to the resource, thereby indicating that the requesting entity may present a high-security risk if allowed to access the resource. Accordingly, if the elapsed time is greater than the high threshold limit, the access request is assigned a high degree of security friction at operation 1016.

If the elapsed time is less than the high threshold level, the security friction system 118 proceeds to operation 1018, where the elapsed time is compared against a mid-threshold limit. The mid-threshold limit is selected to indicate that the length of time since an entity employing the user ID has accessed or attempted to gain access to the resource is moderate, thereby indicating that the requesting entity may present a medium-risk if allowed to access the resource. Accordingly, if the elapsed time is greater than the mid-threshold limit, the access request is assigned a mid-level degree of security friction at operation 1020.

If the elapsed time is less than the mid threshold level, the security friction system proceeds to operation 1022, where the request is assigned a low degree of security friction. A low degree of security friction is used since the request has already been determined to be atypical at operation 1010 but fails to meet the high and mid threshold levels. This degree of atypicality indicates that the length of time since an entity employing the user ID has accessed or attempted to gain access to the resource is relatively small, thereby indicating that the requesting entity likely presents only a low security risk if allowed to access the resource.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be interred. The invention is capable of considerable modification, alteration, and equivalents in form and function, as will occur to those ordinarily skilled in the pertinent arts. The depicted and described embodiments are only examples and are not exhaustive of the scope of the invention.

Consequently, the invention is intended to be limited only by the spirit and scope of the appended claims, giving full cognizance to equivalents in all respects.

What is claimed is:

1. A computer-implemented method for controlling access to a resource, comprising:

receiving a request to access the resource by an entity, the request being received via a protected endpoint environment, the protected endpoint environment comprising an endpoint agent executing on an endpoint device, the endpoint agent being implemented to autonomously decide if a particular action is appropriate for a user behavior, the request being based on a user identity of the entity:

determining whether the request is typical or atypical, the request being typical when an elapsed time between a current resource request time and a previous resource request time is less than a predetermined elapsed time, the request being atypical when the elapsed time between the current resource request time and the previous resource request time is greater than the predetermined elapsed time, wherein the request being atypical providing an indication that access rights of the entity have been compromised;

if the request is typical, granting access to the requested resource; and if the request is atypical, controlling access to the requested resource using one or more user access control methods to provide security friction that would otherwise not have been used if the request were typical, the security friction providing a protective effect when the request is atypical.

2. The computer-implemented method of claim 1, wherein, if the request is typical, access to the requested resource is granted without security friction.

3. The computer-implemented method of claim 1, further comprising:
if the request is typical, controlling access to the requested resource using one or more access control methods to provide a first degree of security friction prior to granting access to the requested resource; and
if the request is atypical, controlling access to the requested resource using one or more access control methods to provide a second degree of security friction prior to granting access to the requested resource, wherein the second degree of security friction is higher than the first degree of security friction.

4. The computer-implemented method of claim 1, further comprising:
determining a degree to which the request is atypical; and
providing different degrees of security friction corresponding to the degree to which the request is atypical.

5. The computer-implemented method of claim 4, further comprising:
using access control methods providing high degrees of security friction for requests having high degrees of atypicality; and
using access control methods providing low degrees of security friction for requests having low degrees of atypicality.

6. The computer-implemented method of claim 1, wherein determining whether the request is atypical comprises:
determining the elapsed time by comparing the time at which the request is made with a time at which a prior request to access the resource was previously received or granted based upon the user identity.

7. The computer-implemented method of claim 6, further comprising one or more of:
determining that the request is atypical when the elapsed time exceeds a first threshold limit; and
determining that the request is atypical when the elapsed time is less than a second threshold limit.

8. The computer-implemented method of claim 7, further comprising:
assigning a degree of atypicality based on a length of the elapsed time, wherein longer elapsed times are assigned higher degrees of atypicality than shorter elapsed times.

9. The computer-implemented method of claim 1, wherein determining whether the request is atypical comprises:
determining that the request is atypical if a software program attempting to access the resource is a software program not typically used to access the resource.

10. The computer-implemented method of claim 1, wherein the user identity is at least part of a user profile, the method further comprising:
determining whether the request is atypical by comparing a current security risk level associated with the user identity in effect at the time of the request with a security risk level associated with the user identity in effect at a time when the user identity was last used to request or gain access to the resource.

11. The computer-implemented method of claim 10, further comprising:
determining a degree to which a request is atypical includes determining a degree to which the security risk levels associated with the user identity differ.

12. A system comprising:
a hardware processor;
an electronic communication channel coupled to the hardware processor; and
a computer-usable medium embodying computer program code, the computer-usable medium being coupled to the electronic communication channel, the computer program code used for asserting different access control methods to provide different amounts of security friction for access to a resource, the computer-usable medium storing instructions executable by the hardware processor and configured to implement operations comprising:
receiving a request to access the resource by an entity, the request being received via a protected endpoint environment, the protected endpoint environment comprising an endpoint agent executing on an endpoint device, the endpoint agent being implemented to autonomously decide if a particular action is appropriate for a user behavior, the request being based on a user identity of the entity:
determining whether the request is typical or atypical, the request being typical when an elapsed time between a current resource request time and a previous resource request time is less than a predetermined elapsed time, the request being atypical when the elapsed time between the current resource request time and the previous resource request time is greater than the predetermined elapsed time, wherein the request being atypical providing an indication that access rights of the entity have been compromised;
if the request is typical, granting access to the requested resource; and
if the request is atypical, controlling access to the requested resource using one or more user access control methods to provide security friction that would otherwise not have been used if the request were typical, the security friction providing a protective effect when the request is atypical.

13. The system of claim 12, wherein the instructions are further configured for:
if the request is typical, access to the requested resource is granted without security friction.

14. The system of claim 12, wherein the instructions are further configured for executing operations comprising:
if the request is typical, controlling access to the requested resource using one or more access control methods to provide a first degree of security friction prior to granting access to the requested resource; and
if the request is atypical, controlling access to the requested resource using one or more access control methods to provide a second degree of security friction prior to granting access to the requested resource, wherein the second degree of security friction is higher than the first degree of security friction.

15. The system of claim 12, wherein the instructions are further configured for executing operations comprising:
determining a degree to which the request is atypical; and
providing different degrees of security friction corresponding to the degree to which the request is atypical.

16. The system of claim 12, wherein the instructions are further configured for executing operations comprising:
using access control methods to provide high amounts of security friction for requests having high degrees of atypicality; and using access control methods to provide low amounts of security friction for requests having low degrees of atypicality.

17. The system of claim 12, wherein the instructions are further configured for executing operations to determine whether the request is atypical comprising:
   determining the elapsed time by comparing the time at which the request is made with a time at which a prior electronic request to access the resource was previously received or granted based upon the user identity.

18. The system of claim 17, wherein the instructions are further configured for executing operations comprising one or more of:
   determining that the request is atypical when the elapsed time exceeds a first threshold limit; and
   determining that the request is atypical when the elapsed time is less than a second threshold limit.

19. The system of claim 18, wherein the instructions are further configured for executing operations further comprising:
   assigning a degree of atypicality to the request based on a length of the elapsed time, wherein longer elapsed times are assigned higher degrees of atypicality than shorter elapsed times.

20. The system of claim 12, wherein the instructions are further configured for executing operations to determining whether the request is atypical comprising:
   determining that the request is atypical if a software program requesting access to the resource is a software program not typically used to access the resource.

21. The system of claim 12, wherein the user identity is at least part of a user profile, and wherein the instructions are further configured for executing operations comprising:
   determining whether the request is atypical by comparing a current security risk level associated with the user identity in effect at the time of the request with a prior security risk level associated with the user identity in effect at a time when the user identity was last used to request or gain access to the resource.

22. The system of claim 21, wherein the instructions are further configured for executing operations comprising:
   determining the degree to which a request is atypical includes determining a degree to which the security risk levels associated with the user identity differ.

* * * * *